Nov. 23, 1965   M. E. WEBSTER   3,219,025
PORTABLE GAS HEATER
Original Filed Dec. 18, 1962   3 Sheets-Sheet 1
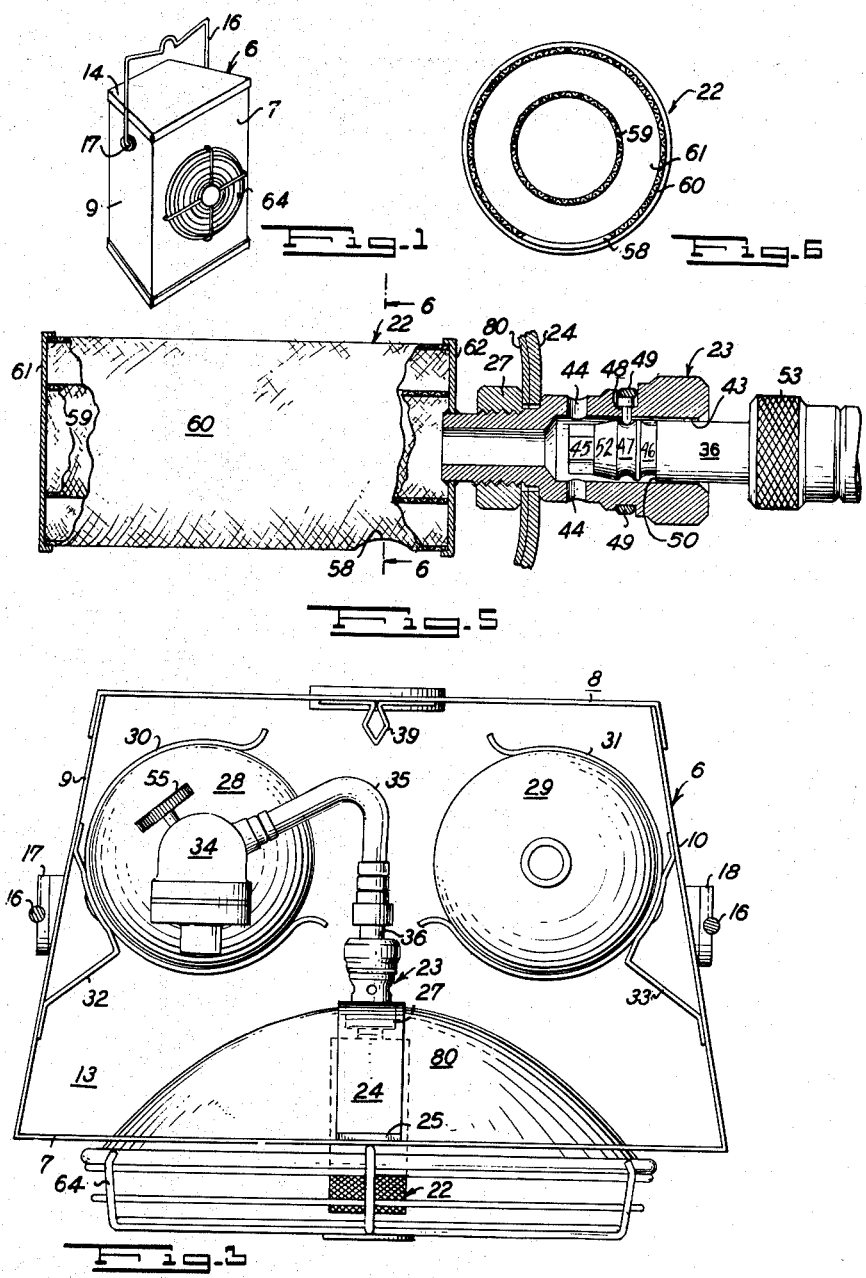
INVENTOR
MILO E. WEBSTER
BY
Burgess, Dinklage & Sprung
ATTORNEY

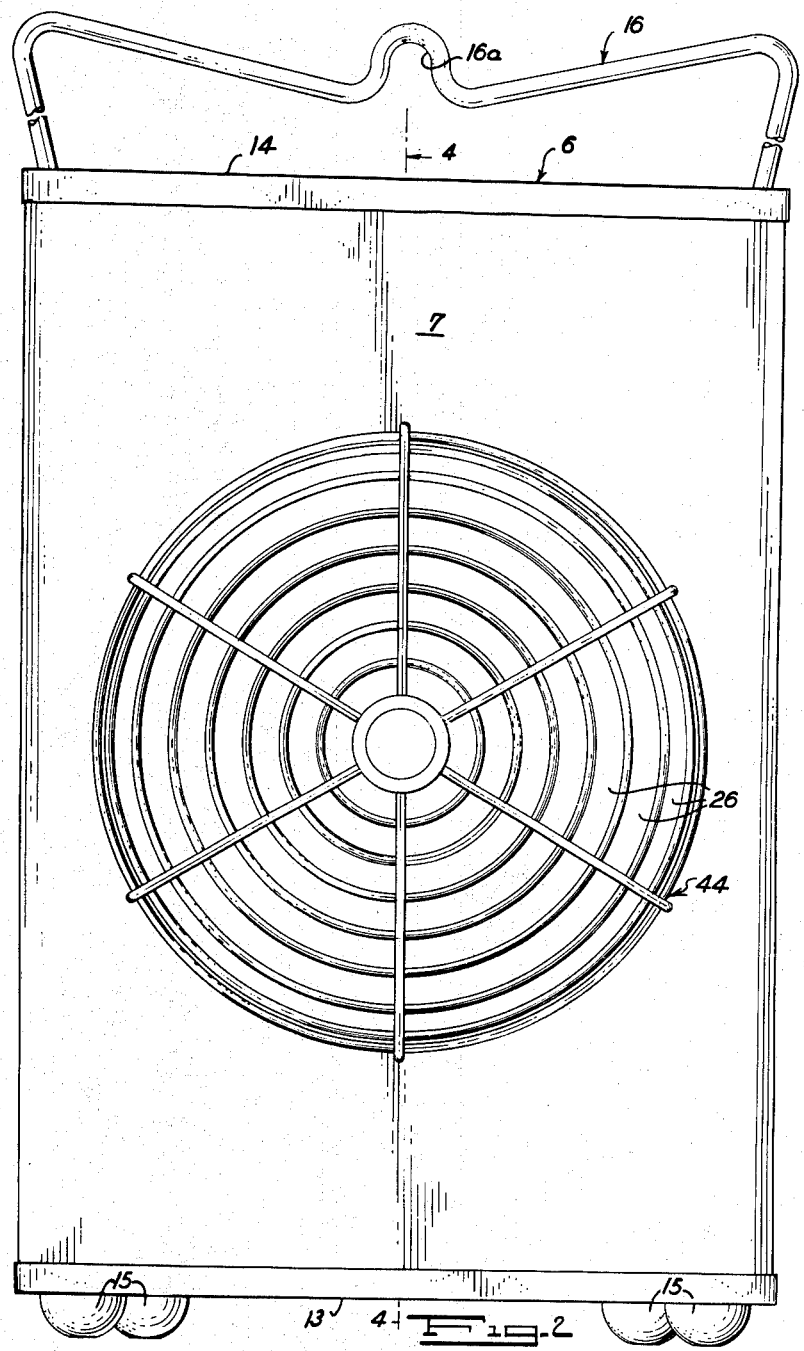

Nov. 23, 1965  M. E. WEBSTER  3,219,025
PORTABLE GAS HEATER
Original Filed Dec. 18, 1962  3 Sheets-Sheet 3
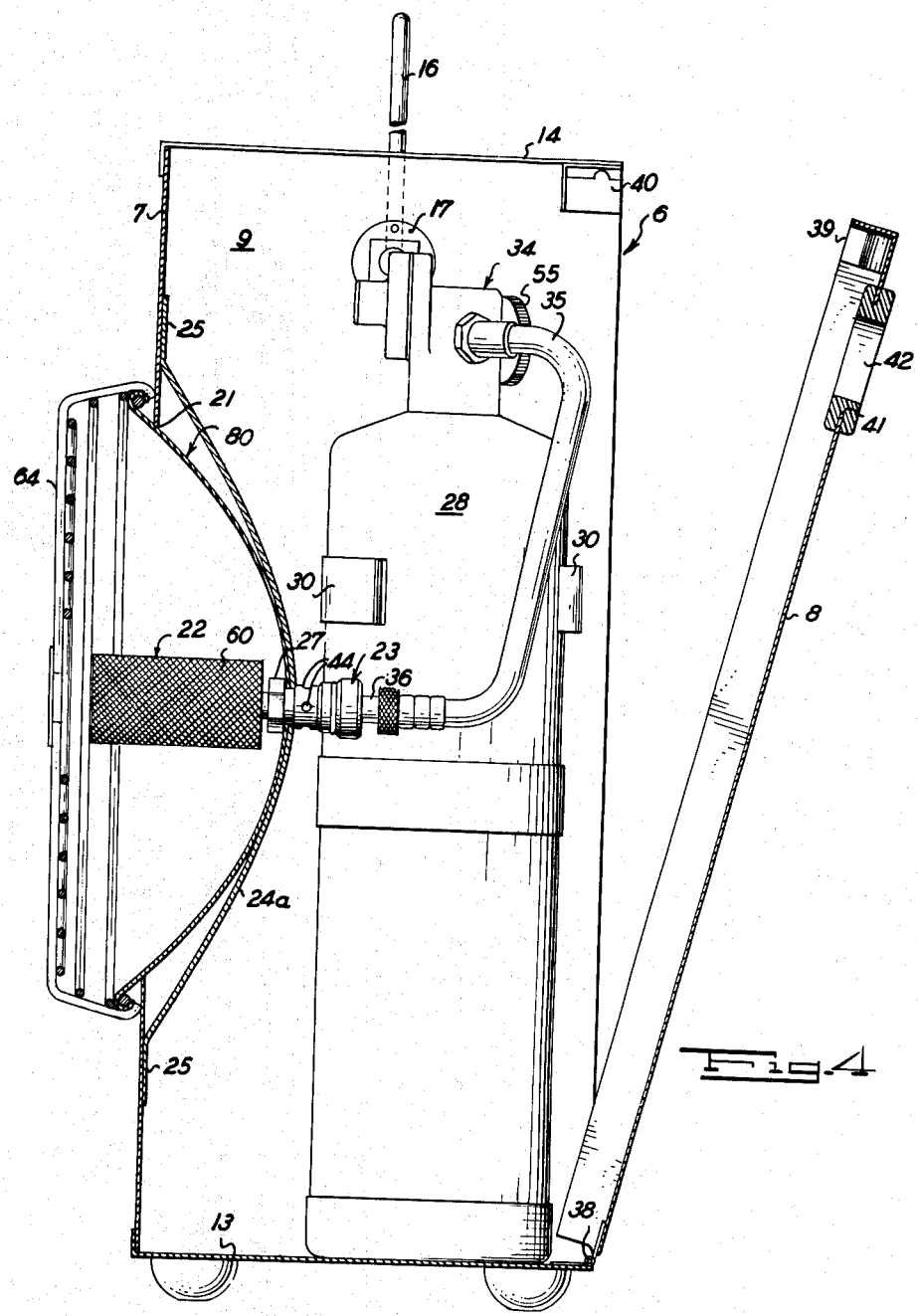
INVENTOR
MILO E. WEBSTER
BY
ATTORNEY

United States Patent Office 3,219,025
Patented Nov. 23, 1965

3,219,025
PORTABLE GAS HEATER
Milo E. Webster, Rochester, N.Y., assignor to Bernz O Matic Corporation, Rochester, N.Y., a corporation of New York
Original application Dec. 18, 1962, Ser. No. 245,552. Divided and this application Feb. 25, 1964, Ser. No. 347,235
5 Claims. (Cl. 126—92)

This application is a division of application Serial No. 245,552, filed December 18, 1962.

This invention relates to portable gas heaters.

In recent years, the use of liquid propane in portable heat providing units has become wide-spread. The propane is stored in liquid form in a cylinder of such size that it can be conveniently held in the hand, and fittings have been developed for use with the cylinders to deliver the fuel contained thereby in gaseous form, so that the cylinders along with their fittings are well-suited for general use and do not require any considerable training of those who use them. Thus, the cylinders and fittings are used for torches and stoves. They are also used for lanterns, and, further, it has been proposed to use them for heating units.

A principal object of the invention is to provide a heating unit well-suited to the use fo liquid fuel stored in small cylinders.

It is also an object of the invention to provide a heater utilizing liquified gas stored in small cylinders, and which is outfitted so that a drop in temperature in the environment in which the heater is disposed will be compensated for by increased heat output of the heater.

A further object of the invention is to provide in a gas heater, a construction which facilitates the lighting of the heater.

Still another object of the invention is to provide a gas heater having means for choking to facilitate the starting of the heater.

According to the invention, a portable gas heater comprises a housing including front and back panels, and opening in the front panel which receives a dished reflector with the concave, reflecting surface thereof facing outwardly, and having a mesh flameless burner centrally positioned in the reflector for radiation therefrom to the reflector. A gas supply cylinder is removably mounted in the housing, and a conduit system connects the tank with a fitting connected to the burner and projecting into the housing, whereby gas can be delivered from the tank to the burner. The housing is provided with a door for access to the inside of the housing, and a grill guard is provided over the reflector.

In a preferred embodiment of the heater, two gas supply tanks are contained in the housing. One of the tanks is connected to the burner, while the other serves as a spare. The tanks can be positioned one on either side of the burner fitting, so that they tend to balance the heater about the burner fitting, and, further, permit access to the burner fitting from behind the tanks. The access door of the housing is preferably in the back panel thereof and as well as permitting replacement of the cylinders, permits access to the burner fitting.

The heater preferably includes, in the conduit system, a temperature compensating regulator valve operating in the manner that when the temperature in the environment of the heater is lowered, a relatively high delivery pressure in the conduit is maintained, so that the heater dispenses heat at a high rate.

Another preferred feature is providing a grill so that the fingers cannot be passed through it, and positioning the burner so that it extends to adjacent the grill and within reach of a match held in the fingers on the opposite side of the grill. This construction permits the starting of the heater without removing the grill, and, at the same time, permits utilization of a grill having small openings so as to reduce the likelihood of injury to persons.

A feature of the heater is the provision of means for choking, whereby starting of the heater is faciliated. The mixer comprises an elongated fitting having a bore extending axially therethrough and a radially extending passageway through the wall thereof for passage of air from outside the fitting to within the bore. A nipple having a gas spud mounted on the outlet end thereof is received in the bore with the gas spud disposed adjacent the radially extending passageway. The nipple is movable axially in said bore between a first position and a second position. In said first position, the nipple obstructs air passage through the radial passageway in the wall of the fittings, and thereby provides a choking action. In the second position, less obstruction to passage of air through the radial passageway is provided, and this condition is for normal mixing. Desirably, the nipple is movable in the bore directly along the axis of the bore, and is removable therefrom by such movement, and the nipple is provided with axially spaced grooves. A bayonet pin is provided in the fitting for cooperation with the grooves for releasably securing the nipple in said first and second positions.

The invention is further described in reference to the accompanying drawings, wherein:

FIG. 1 is an isometric view of a heater according to the invention;

FIG. 2 is a front elevation view of the heater shown in FIG. 1;

FIG. 3 is a top plan view of the heater shown in FIG. 1, with the top panel of the housing removed to better illustrate the positioning of parts within the heater;

FIG. 4 is a side elevation view in cross-section of the heater shown in FIG. 1;

FIG. 5 is a side elevation view, partially in cross-section and partially broken away, of a burner as can be used with the heater of the invention; and FIG. 6 is an end view taken along line 6—6 in FIG. 5.

In the drawings, like reference characters indicate corresponding parts.

Referring to the drawings, the heater there shown includes a housing 6 having front panel 7, back panel 8, side panels 9 and 10, bottom panel 13, and top panel 14. The heater is provided with feet 15 which are advantageously of a material such that the heater will not mar surfaces on which the heater is likely to be placed. A handle 16 is hinged to the housing sides at 17 and 18. The handle can be moved from a position overlying the heater to a position so that its cross arm is behind the heater, and the handle is provided with a recess 16a by means of which the heater can be hung on a hook. An opening 21 is provided in the front panel 7, and a dished reflector 8a is disposed in this opening with the concave reflecting surface outwardly. A mesh flameless burner 22 is centrally positioned in the reflector for radiation therefrom to the reflector. It will be observed that this burner occupies relatively little space within the reflector and hence, exposes a large surface of the reflector for heat radiation. Thus, the outside diameter of the burner can be about 1 inch, whereas the diameter of the reflector can be about 6–8 inches, for example about 7 inches. The burner is mounted on a fitting 23 which extends from the burner 22 through the reflector and to within the housing 6. The reflector and the burner are retained in place by a leaf spring 24 which slidably engages the back of the front panel 7 with the leaf spring feet 25.

A nut 27 is threaded onto the fitting 23 and is turned up sufficiently tight to load the leaf spring 24 so that the burner and reflector are securely held by the leaf spring.

A grill 64 is provided for the reflector and prevents access to the burner as might occasion injury. A feature of the heater of the invention is providing the grill so that the fingers cannot pass therethrough while at the same time positioning the burner 22 at such a distance from the grill that the burner can be reached with a match held in the fingers outside of the grill. Thus, the grill can be provided having concentric openings 26 which are about one fourth to one half inch in their radial dimension, and the burner can be spaced from the grill about ¾–1¼ inches.

Gas supply tanks 28 and 29 are mounted within the housing, respectively, in brackets 30 and 31. These brackets are riveted to the supports 32 and 33 which are spot welded to the sides of the housing. The mounting of the tanks or cylinders 28 and 29 in the brackets is such that the cylinders are releasably secured in the housing. One of the cylinders is connected to the burner fitting 23 by a conduit system including the valve 34 which is mounted on the cylinder 28, the flexible tubing 35, and the nipple 36 which interconnects with the burner fitting 23. The cylinder 29, which is not connected to the burner fitting 23, serves as a spare and can be connected up when the cylinder 28 becomes exhausted.

In a preferred construction of the invention, the cylinders 28 and 29 are positioned, as can be best seen in FIG. 3, one on either side of the burner fitting 23. This arrangement tends to balance the heater about the burner fitting, and further, permits access to the burner fitting from behind the cylinders for manual manipulation of the burner.

The housing further includes a door permitting access thereto. As is shown in the drawing, the back panel 8 is hinged at 38 to the bottom panel 13 so that the entire back panel 8 is provided as a door and, thereby, convenient access to within the housing is provided. To secure the door in the closed position, a snap fitting is provided. This fitting includes the male member 39 and the female member 40. To facilitate opening of the door and also to provide an air inlet to the housing, an opening 41 is provided in the back panel. This opening is lined with a rubber grommet 42 which provides protection from the sharp corners of the opening 41.

A feature of the invention is provision of an air-gas mixer with means for chocking, whereby to facilitate the starting of the heater. In the embodiment illustrated in the drawings, the fitting 23 is provided with a bore 43 which extends axially through the fitting. See FIG. 5. Radially extending passageways 44 extend through the wall of the fitting and are provided for passage of air from outside the fitting to within the bore. As can be best seen in FIG. 4, the flexible tubing 35 of the conduit system interconnecting the gas cylinder 28 and the burner 22, terminates in a nipple 36 having a gas spud 45 disposed adjacent the radially extending passageways 44. The nipple is slidable in the bore of the fitting 23, and can be removed and inserted in the bore of the fitting by pulling it axially or pushing it axially relative to the bore of the fitting. The nipple 36 is provided with circumferential grooves 46 and 47, and the fitting is provided with a bayonet pin 48 for cooperation with the grooves 46 and 47 so as to provide a bayonet connection between the fitting 23 and the nipple 36. The pin 48 is radially movable in a radially extending hole in the wall of the fitting 23, and extends through the wall for insertion in the grooves 46 and 47. A split ring spring 49 is positioned about the fitting 23 and urges the pin 48 radially inwardly. Upon pushing the nipple 36 into the bore 43, the nipple lifts the pin 48 against the split ring spring 49, the nipple slides over the pin and the pin snaps into groove 47 whereupon the pin tends to retain the nipple in a fixed position in the bore. Upon pushing the nipple further into the bore, the nipple slides further past the pin until the pin snaps into the circumferential groove 46. Further travel of the nipple 36 in the bore 43 is prevented by the shoulder 50 on the nipple 36. This shoulder is developed with a sharp edge and is of slightly larger diameter than the portion of the nipple in front of the shoulder, so that the pin 48 is effective to arrest movement of the nipple 36 beyond a position wherein the pin 48 engages the circumferential groove 46.

Thus, the nipple 36 is movable between a first position wherein the pin 48 engages the circumferential groove 47, and a second position wherein the pin 48 engages circumferential recess 46. In the said second position, the nipple obstructs passage of air into the bore 43 via the radial openings 44, and hence, a restricted air supply is provided for mixing with gas issuing from the gas spud 45. This condition provides a choking action which facilitates the starting of the heater. It will be observed that the nipple 36 is provided with a tapered end portion 52 which will be disposed radially inwardly of the openings 44 with the nipple in the choking position, and that whereas this tapered portion 52 will not close off the supply of air through the passageways 44, yet it will serve to restrict the air supply. In the position wherein the pin 48 engages the circumferential groove 47, the nipple is in a position corresponding to a normal air-gas mixture and less obstruction to air passage through the passageways 44 is offered.

To facilitate the movement of the nipple 36 in the fitting 23, a hand grip 53 is provided. This can be a knurled ring or a rubber ring which facilitates the gripping of the nipple for the movement thereof.

The cylinder 28 and the cylinder 31 can each be of the type disclosed in Milo E. Webster Patent 2,793,504, and the valve 34 can be of the type disclosed in Milo E. Webster Patent 2,854,991. Accordingly, the valve 34 includes the wheel 55 for turning the gas supply on and off, and, if desired, for providing a throttling action, and a pressure regulator (not shown) is housed within the valve. This type of valve is particularly well suited for use in the heater of the invention since it has a negative factor and hence, compensates automatically for changes in temperature. Thus, when the cylinders contain a liquified gas, such as liquified propane, the vapor pressure of the propane within the cylinder will depend on the temperature of the cylinder and hence, will depend on the temperature prevailing in the environment in which the cylinder is disposed. When the temperature of the environment is low, the vapor pressure of the propane will be low, yet for a low temperature of the environment, a high heat output is desired. A valve according to Patent 2,854,991 tends to maintain the heat output at a high level notwithstanding low temperature of the environment, since for a low pressure within the cylinder, the valve is open further than for a high pressure within the cylinder. On the other hand, as the temperature of the environment increases, the valve moves toward the closed position. Thus the valve tends to maintain a constant delivery of gas to the burner, notwithstanding variation in ambient temperature.

The burner 22 can be of known construction. This burner is a flameless burner adapted to provide catalytic combustion and comprises inner screen 59 and outer screen 60. An opening 58 is provided in the outer screen 60 to facilitate the lighting. These screens are mounted on end plates 61 and 62 which can be imperforate and which secure the screens in coaxial relation. The inner screen 59 is a mesh screen formed of or coated with material effective to provide flameless, surface combustion of the gas mixture introduced into the burner. The outer screen 60 can be of the same construction and serves to complete combustion of any gas which may escape the inner screen without the occurrence of the desired combustion at the inner screen. The screen can be according to any of the catalytic screen constructions disclosed in Patent 2,720,494 to Suter et al. and can be about 40–80 mesh (Tyler Standard); the tube of the inner screen about half inch in diameter and the tube of the outer screen about one inch in diameter. The fitting 23 is welded to the end plate 62 of the burner 22 to provide a suitable connection.

In the operation of the heater illustrated in the drawings, the valve 34 is screwed onto a cylinder and the cylinder is then inserted in a bracket within the housing. Next, the nipple 36 is inserted into the bore 43 of the fitting 23 and is advanced to the position wherein the pin 48 is received in the circumferential groove 46 and the supply of air through the radial openings 44 is obstructed. This condition will provide a choking action. A match can then be inserted through the grill 64 and held under the burner 22 so that the flame plays on the burner 22, and the wheel 55 of the valve 34 can then be turned to open the valve. The valve can be opened wide, and the burner will then ignite. The nipple 36 can then be moved to the position wherein the pin 48 is received in the circumferential groove 47, whereby the nipple is moved rearwardly in the bore 43 of the fitting 23 and the obstruction to air passage into the bore 43 is reduced so that the choking is stopped. The burner will then glow and radiate heat to the reflector, whereby the heating action is provided. When the heater is not in use, the valve 34 can be, and preferably is, disconnected from its cylinder.

In one embodiment of the burner, the fittings 17 and 18 which receive the ends of the handle 16 are provided with horizontal grooves 71 and 72. The handle can then be pivoted 90° toward the rear and so that portions of the handle 16 snap into the recesses 71 and 72. The handle will then be stabilized in the horizontal position. The burner can then be tipped back so that it rests on the handle cross arm and with the front panel 7 inclined at an angle to the horizontal. In this way heat can be directed upward. If desired, several grooves such as 71 and 72 can be provided so that various angles of inclination can be selected.

While the invention has been described in detail with respect to particular embodiments thereof, various modifications will be apparent from the disclosure, and it is desired to secure by these Letters Patent all such alterations as are within the scope of the appended claims.

What is claimed is:
1. A portable gas heater comprising:
   (a) a housing including front and back panels;
   (b) means defining an opening in the front panel;
   (c) a dished reflector positioned in said opening with the concave, reflecting surface thereof facing outwardly;
   (d) a grill guard over the reflector;
   (e) a mesh flameless burner centrally positioned in the reflector for radiation therefrom to the reflector;
   (f) a fitting connected to said burner projecting into the housing and for delivery of gas to the burner;
   (g) a first gas supply tank and a second gas supply tank releasably secured in said housing, said tanks being positioned one on either side of the burner fitting tending to balance the heater about said burner fitting and permitting access to the burner fitting from behind the tanks;
   (h) a conduit system connecting one of said tanks to said burner fitting for communicating the said one tank with the burner fitting;
   (i) said back panel including a door for access to the housing and replacement of the gas cylinders;
   (j) means for choking operatively interposed between the tank connected to the burner and the burner, accessible through the doorway of the back panel.

2. A portable gas heater according to claim 1, said conduit system including a temperature compensating regulator valve having a negative factor.

3. A portable gas heater according to claim 1, said grill preventing passage of fingers, said burner extending to termination adjacent said grill within reach of a match held in the fingers on the opposite side of the grill.

4. A portable gas heater according to claim 1, said burner fitting being elongated and having a bore extending axially therethrough, a radially extending passageway through the wall of said fitting for passage of air from within the housing to within the bore, said conduit system including a nipple having a gas spud mounted on the outlet end thereof received in said bore with the gas spud disposed adjacent the radially extending passageway of the fitting, said nipple being movable axially in said bore between a first position and a second position, the nipple in said first position obstructing air passage through said passageway for providing a choking action and in the second position providing less obstruction to such air passage, whereby a choking action can be obtained by placing said nipple in said first position and a normal air-gas mixture can be provided by placing said nipple in said second position.

5. A portable gas heater according to claim 4, the nipple being movable in said bore directly along the axis thereof and being removable therefrom by such movement, axially spaced grooves in said nipple and a bayonet pin in said fitting for cooperation with said grooves for releasably securing the nipple in said first and second positions.

References Cited by the Examiner

UNITED STATES PATENTS

| | | | |
|---|---|---|---|
| 1,253,090 | 1/1918 | Palmer | 126—86 |
| 1,473,844 | 11/1923 | Garbarini | 126—92 X |
| 2,350,860 | 6/1944 | Anderson | 126—93 |
| 2,407,124 | 9/1946 | Anderson et al. | |
| 2,854,991 | 10/1958 | Webster | 137—322 |
| 2,896,606 | 7/1959 | Ross et al. | 126—38 |

FOREIGN PATENTS

| | | |
|---|---|---|
| 216,184 | 7/1961 | Austria. |
| 821,764 | 8/1937 | France. |
| 1,129,123 | 9/1956 | France. |
| 634,881 | 3/1950 | Great Britain. |
| 833,223 | 4/1960 | Great Britain. |
| 559,179 | 3/1957 | Italy. |
| 559,553 | 3/1957 | Italy. |

FREDERICK L. MATTESON, JR., *Primary Examiner.*

FREDERICK KETTERER, JAMES W. WESTHAVER,
*Examiners.*

UNITED STATES PATENT OFFICE
CERTIFICATE OF CORRECTION

Patent No. 3,219,025                                 November 23, 1965

Milo E. Webster

It is hereby certified that error appears in the above numbered patent requiring correction and that the said Letters Patent should read as corrected below.

Column 1, line 27, for "fo liquid" read -- of liquified --; column 2, line 19, for "fittings" read -- fitting --; column 3, line 48, for "chocking" read -- choking --; column 6, lines 22 and 23, for "conduit system" read -- choking means --.

Signed and sealed this 24th day of January 1967.

(SEAL)
Attest:

ERNEST W. SWIDER
Attesting Officer

EDWARD J. BRENNER
Commissioner of Patents